United States Patent
Munro et al.

[11] Patent Number: 6,118,238
[45] Date of Patent: Sep. 12, 2000

[54] MOTOR STARTING APPARATUS FOR AN ENGINE DRIVEN GENERATOR

[75] Inventors: James L. Munro, Dunkirk, Md.; Thomas C. Matty, North Huntingdon, Pa.

[73] Assignee: Satcon Technology Corporation, Cambridge, Mass.

[21] Appl. No.: 09/140,744

[22] Filed: Aug. 26, 1998

[51] Int. Cl.[7] .................................................. H02P 5/20
[52] U.S. Cl. ........................... 318/141; 318/478; 322/10; 322/13; 322/46; 290/46
[58] Field of Search ................................... 318/140–158, 318/139, 445–478; 322/10, 11, 12, 13, 14–39, 44–46; 290/46–48

[56] References Cited

U.S. PATENT DOCUMENTS

| | | | |
|---|---|---|---|
| 5,015,941 | 5/1991 | Dhyanchand | 322/10 |
| 5,068,590 | 11/1991 | Glennon et al. | 322/10 |
| 5,140,245 | 8/1992 | Stacey | 318/723 |
| 5,281,905 | 1/1994 | Dhyanchand et al. | 322/32 |
| 5,495,163 | 2/1996 | Rozman et al. | 322/10 |
| 5,747,971 | 5/1998 | Rozman et al. | 322/10 |
| 5,942,818 | 8/1999 | Satoh et al. | 322/28 |

*Primary Examiner*—David Martin
*Attorney, Agent, or Firm*—George W. Neuner; Dike, Bronstein, Roberts & Cushman LLP

[57] ABSTRACT

A conventional motor controlling circuit is adapted to control an inverter that drives a permanent magnet generator as a motor to spin an engine to a speed sufficient to permit the engine to start. The commutation frequency is adjusted as a function of speed utilizing an automatic commutation frequency adjustment circuit. This circuit has multiple commutation frequency ranges that overcome a large initial bearing drag during low speed operation while still permitting high speed operation. The automatic commutation frequency adjustment circuit preferably generates first and second voltage ramps that overcome the initial bearing drag and accelerate the generator at a rate fast enough for sufficient back EMF to be generated for a closed-loop commutation phase. A speedup circuit operates during the closed-loop commutation phase to achieve the high speeds typically necessary for engine starting. The inventive circuits even permit a turbine type engine to be successfully started.

22 Claims, 7 Drawing Sheets

| STATE | DIRECTION REVERSE FORWARD | OUTPUTS | | | | | | INPUT SAMPLES | |
|---|---|---|---|---|---|---|---|---|---|
| | | N1 | N2 | N3 | P1 | P2 | P3 | FORWARD | REVERSE |
| R OR 0 | | OFF | ON | OFF | ON | OFF | ON | N/A | N/A |
| A | | OFF | OFF | ON | ON | OFF | OFF | PH2 | PH2 |
| B | | OFF | OFF | ON | OFF | ON | OFF | PH1 | PH3 |
| C | | ON | OFF | OFF | OFF | ON | OFF | PH3 | PH1 |
| D | | ON | OFF | OFF | OFF | OFF | ON | PH2 | PH2 |
| E | | OFF | ON | OFF | OFF | OFF | ON | PH1 | PH3 |
| F | | OFF | ON | OFF | ON | OFF | OFF | PH3 | PH1 |

MOTOR STARTING APPARATUS FOR AN ENGINE DRIVEN GENERATOR

BACKGROUND OF THE INVENTION

1. Field of the Invention

The field of the invention is electrical power generation, particularly an apparatus for starting an engine driving a permanent magnet generator. The invention also relates to a start inverter apparatus feeding multiphase power to a permanent magnet generator to drive the generator as a motor and thereby spin an engine connected to the generator to a speed sufficient to permit the engine to start.

2. Description of Related Art

Utilizing a generator as a motor is a conventional technique well known to those of skill in the art. Furthermore, driving a generator as a motor to spin an engine connected to the generator to permit the engine to be started is also conventional.

There are a variety of motor control devices that are utilized to start electric motors. Indeed, such motor control devices have been reduced to a single chip. One example is the Microlinear ML4425/ML4426 motor controlling chip that is typically utilized to start a brushless DC motor. FIG. 8 illustrates the start-up sequence generated by this chip which includes three phases, the reset/align phase, the open-loop phase and the closed-loop running phase. This Microlinear chip has the advantage of not requiring active rotor position sensing. Instead, the chip utilizes a reset/align phase in which the rotor is forced to align to a known position.

As shown in the timing diagram of FIG. 8, this reset/align phase is triggered by a low reset (bar) signal. At the end of the reset/align phase, the reset (bar) signal changes sign thereby initiating the open loop phase.

With the position of the rotor now known, the open loop commutation phase can then successfully utilize a commutation sequence to generate a rotating field that drives the rotor. The commutation states that comprise this commutation sequence are shown in FIG. 9. This Figure also illustrates all of the switch closure On/Off states that control commutation. Because such commutation is generally known, no further description is necessary.

However, reference is made to FIG. 10 which further illustrates the commutation sequence in a wye connected motor. The commutation states illustrated in FIGS. 9 and 10 control the gate drive signals of the motor thereby causing a current to flow in the motor windings as shown in FIG. 10. As the states step from A to F (FIG. 9) a rotating magnetic field is developed which rotates the permanent magnets on the rotor shaft.

The 6-step sequence (A–F) in the open loop phase is repeated until enough back EMF is generated to allow a phase-lock loop circuit to lock into and control the commutation during the closed loop operation. This closed loop operation or phase is initiated by an enable E/A signal that changes sign as further illustrated in FIG. 8.

The reset (bar) and enable E/A signals are generated by the motor controller chip. The time relationship of these signals may be adjusted by setting a capacitor value based on motor dynamics.

Although such conventional motor controlling-chips would be quite useful in driving a permanent magnet generator as a motor to thereby spin an engine to a speed sufficient that the engine can be started, there are several obstacles that prevent such an adaptation. First of all, such conventional motor controlling chips do not produce enough current to drive a typical permanent magnet generator.

Furthermore, the position of the rotor, the DC voltage, and high static shaft friction can contribute to unsuccessful motor starting. In other words, there is typically a shaft that is driven by the engine to spin the permanent magnet generator. Such shafts have a high coefficient of friction particularly when they are first rotated due to the difference between the static coefficient of friction and the dynamic coefficient of friction.

Still further, such shafts may also include an air bearing which requires a relatively high RPM until bearing liftoff occurs. Once bearing liftoff does occur, then such air bearings are nearly frictionless. However, until such liftoff occurs there is a very high coefficient of friction that must be overcome by the permanent magnet generator being driven as a motor in order to successfully spin the engine to a speed sufficient to permit starting. Merely utilizing a conventional motor controller chip to drive a permanent magnet generator as a motor would fail because the typical open loop ramp rate does not allow the RCO/VCO voltage to raise high enough to generate sufficient back EMF for the phase-lock loop circuit to transition to a closed loop operation.

Even if the open loop ramp rate is increased to realize a higher voltage, the initial VCO frequency is too fast to commutate the rotor. Furthermore, if the ramp time is extended to realize a higher voltage, the rotor does not accelerate rapidly enough and will not follow the ramp. Thus, commutation with the rotor is lost and motor starting fails. All of these problems which have been recognized by the inventors of this application prevent commercially available motor controller chips from being applied to engine starting via a permanent magnet generator being driven as a motor.

Furthermore, conventional circuits that drive a permanent magnet generator as a motor utilize active rotor position sensors in order to control the commutation of the generator to drive it as a motor and thereby spin the engine. Such active rotor position sensors provide a high degree of control that is typically necessary to drive the permanent magnet generator as a motor.

However, such active rotor position sensors are subjected to an extremely harsh environment including high temperatures and high rotor speeds. Furthermore, such sensors must be precisely aligned with the magnets which necessarily increases the cost. The harsh environment and susceptibility to misalignment all contribute to low reliability.

Therefore, there is a need for a motor controlling circuit that can withstand the harsh environment presented by a permanent magnet generator with high reliability and low cost. This need is particularly acute because of the deregulation of the electric utility industry which now demands smallscale, low cost and highly reliable electrical power generation systems.

SUMMARY OF THE INVENTION

An object of the invention is to adapt conventional motor controlling devices to the environment of driving a permanent magnet generator as a motor to spin an engine and thereby permit the engine to be started.

Another object of the invention is to overcome the difficulties in adapting a commercially available motor controlling chip to driving a permanent magnet generator as a motor.

A further object of the invention is to provide a motor controlling device that does not utilize active rotor position sensing to commutate the permanent magnet generator as a motor.

Another object of the invention is to provide a speed control for the generator being driven as a motor thereby allowing the engine to be run at various commanded speeds.

Yet another object of the invention is to provide a motor controller that automatically adjusts the commutation frequency as a function of speed. Such a control technique would allow the motor to overcome a high bearing drag at low shaft speeds and still permit high shaft speeds.

To achieve these objects, the present invention provides a specially designed start inverter unit that controls the commutation frequency of three phase AC power supplied to a permanent magnet generator thereby driving the permanent magnet generator as a motor to spin a fossil fuel engine to allow it to start. The inventive start inverter unit includes an automatic commutation frequency adjustment circuit connected to a brushless motor control circuit which automatically adjusts the commutation frequency as a function of permanent magnet generator speed.

Preferably, the automatic commutation frequency adjustment circuit has multiple commutation frequency ranges that are intended to overcome a large initial drag as well as adjusting the speed range to allow high speed operation when the initial bearing drag has been overcome.

Furthermore, the invention also includes a built-in test function and a multiplexer that switches between inputs from the brushless motor control circuit and a built-in-test-and-control input to thereby provide a selected input to an inverter interface that drives the start inverter. In this way, a built-in test may be utilized to diagnose or troubleshoot the start inverter.

The invention also utilizes an improved start sequence that modifies the conventional open loop phase by providing multiple ramps that allow for initial low frequency operation followed by an acceleration rate fast enough to develop sufficient speed and back EMF for a phase lock loop in the closed loop phase.

Furthermore, a speed-up circuit is realized that increases the maximum VCO output frequency thereby providing sufficient low motor speed for starting, and high motor speed for normal operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
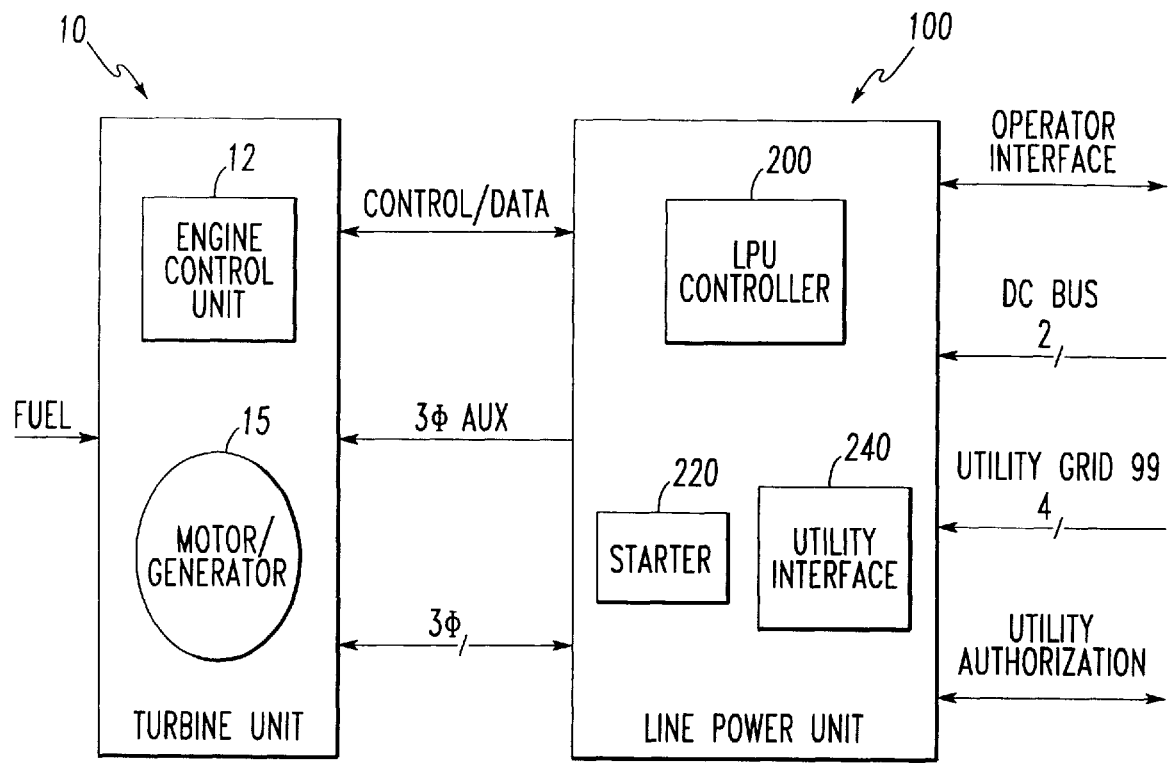
FIG. 1 is a typical microturbine generator system environment in which the invention may be applied to drive the motor/generator with the inventive starter thereby spinning the engine to permit starting thereof.

FIG. 1 illustrates a typical microturbine generator system in which the invention may be applied. As shown in FIG. 1, this microturbine generator system includes a turbine unit 10 having engine control unit 12 and motor/generator 15. Fuel is fed to the motor which may be constructed with a turbine. The motor drives the generator which outputs three phase electrical power to the line power unit 100.

The line power unit (LPU) 100 includes an LPU controller 200, starter 220, and utility interface 240.

The LPU controller 200 controls various functions such as conversion of the three phase power supplied by the motor/generator 15 and switching of this power to the utility grid 99.

An operator interface may also be provided to interface with the LPU controller 200. The utility interface 240 includes various elements that interface the three phase power supplied the motor/generator 15 with the utility grid 99.

Of particular interest in FIG. 1 is the starter 220 which is utilized to start the motor/generator 15. This invention is directed to certain improvements in the starter 220 as described in detail below.

Figure 2:
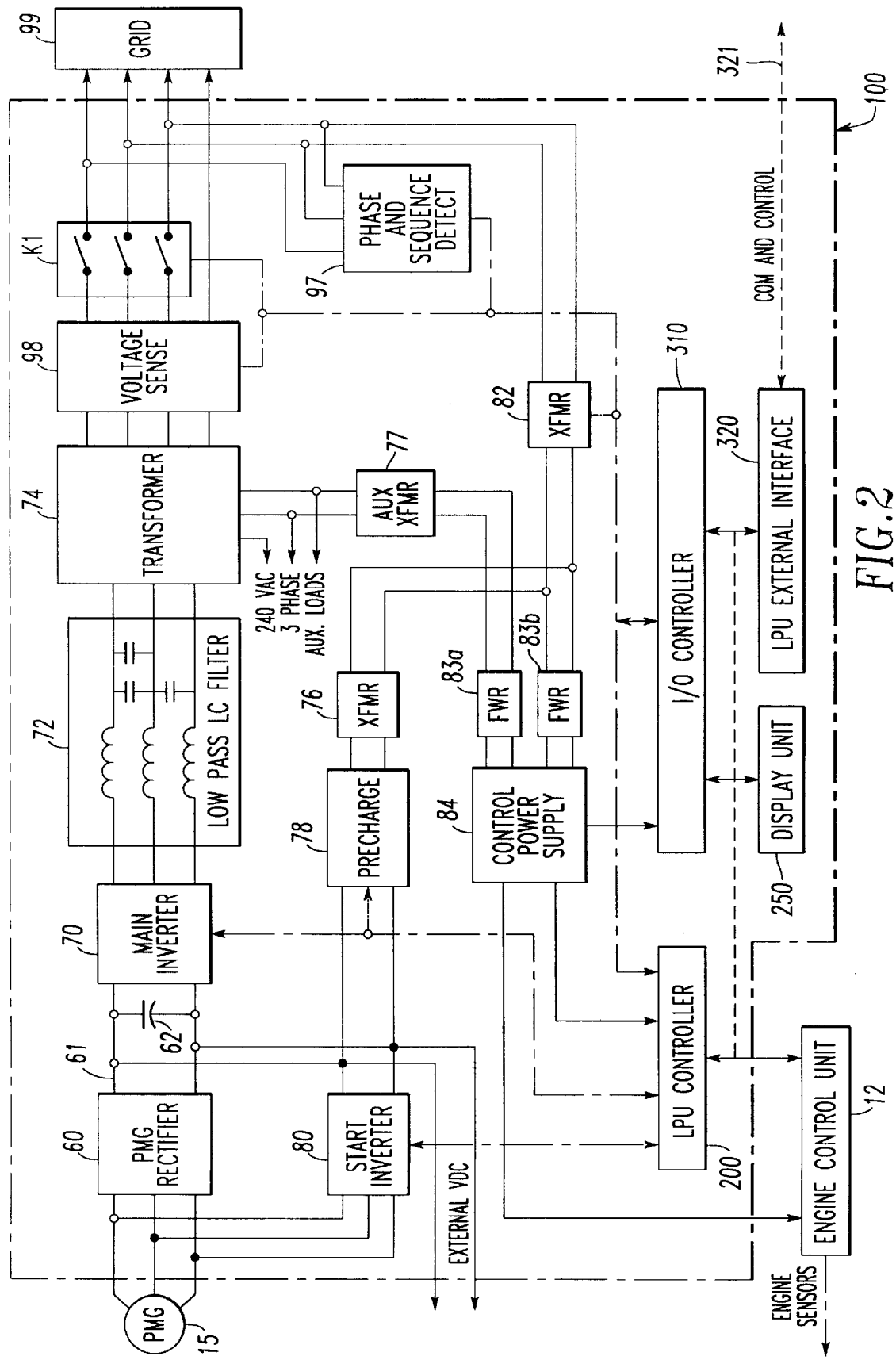
FIG. 2 is a detailed block diagram showing the components of a typical generator system in which the start inverter invention of the present application may be applied.

FIG. 2 illustrates details of the line power unit 100 which is another example of an environment in which the inventive start inverter may be applied. Details of the line power unit 100 are set forth in related, co-pending application Serial No. (Attorney Docket # 1215-371) which is hereby incorporated by reference. For the purposes of this invention, it is sufficient to state that the invention may reside in the start inverter unit 80 which is connected to the permanent magnet generator (PMG) 15, as shown.

The start inverter 80 may take power directly from an external DC voltage source or from DC bus 61, as shown in FIG. 2. The external DC voltage source may be constructed with, for example, a battery. The DC bus 61 is supplied DC power via the grid. More particularly, the three phase electrical power is supplied from the grid 99 through closed contactor K1 to transformer 74. Transformer 74 steps down the voltage supplied from the utility grid 99 and supplies it to a main inverter 70 via low pass LC filter 72. The main inverter 70 transforms the three phase AC power to a DC voltage that is supplied to the DC bus 61.

In this way, the start inverter 80 may be supplied with DC power from the DC bus 61. The start inverter 80 converts this DC power from the DC bus 61 into three phase AC power that is fed to the permanent magnet generator 15.

The LPU controller 200 feeds various control signals to the start inverter 80 such as speed commands and initiation commands that initiate the start phase. The LPU controller 200 also includes a control line to engine control unit (ECU) 12 which is responsible for controlling the engine connected to the permanent magnet generator 15. In this way, the LPU controller 200 can initiate the start phase by sending a signal to the start inverter 80 which drives the permanent magnet generator 15 as a motor to spin the engine and thereby permit starting.

When sufficient speed has been attained, the ECU 12 sends a command to the LPU controller 200 to discontinue starting of the engine.

Figure 3:
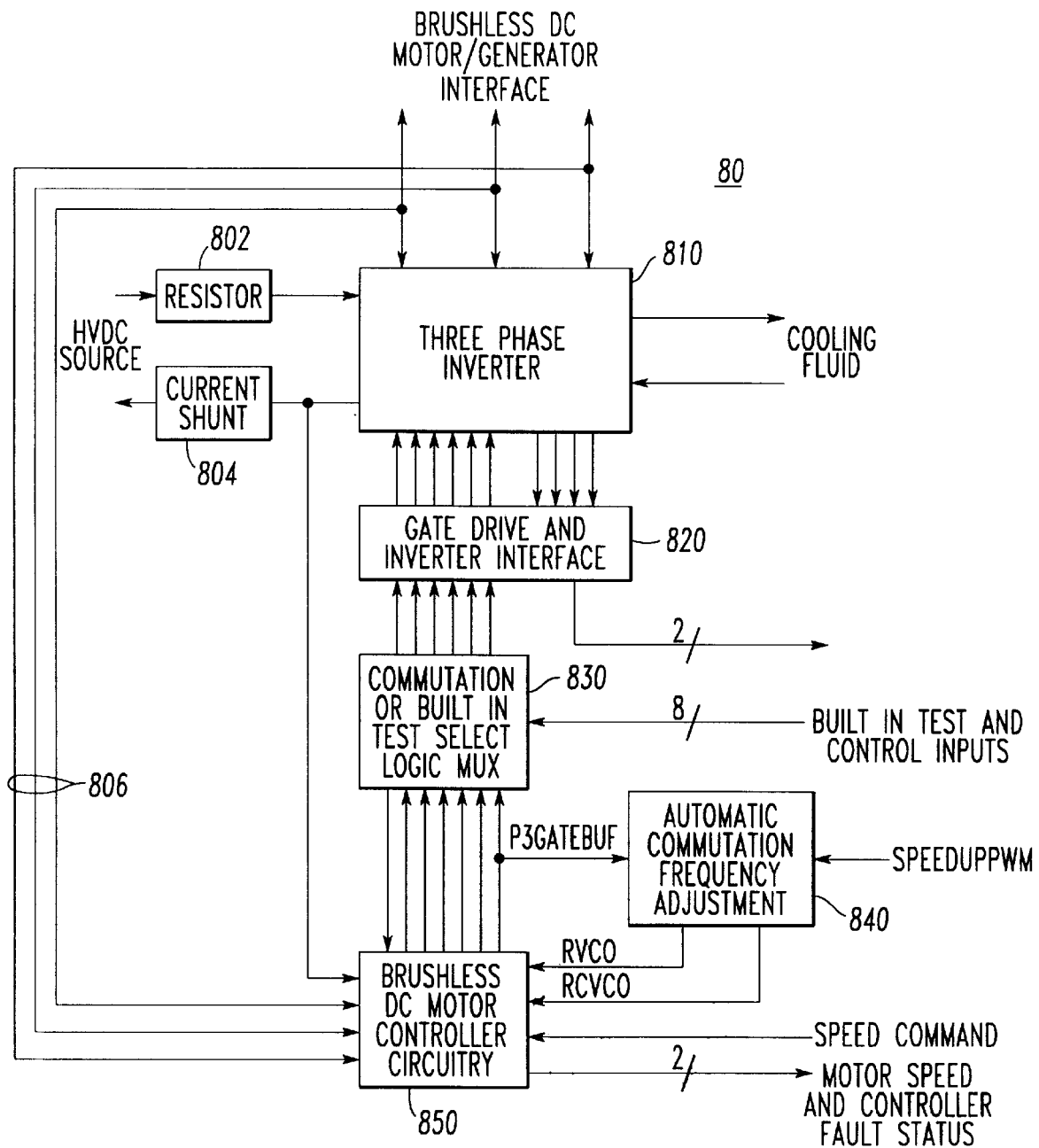
FIG. 3 is a detailed circuit diagram of the inventive start inverter unit.

FIG. 3 shows the details of the start inverter 80 according to the invention. The start inverter 80 includes a three phase inverter 810 that is connected to a brushless DC motor/generator interface that interfaces with the permanent magnet generator 15.

A brushless DC motor controller circuit 850 receives a back EMF signal from the brushless DC motor/generator interface via back EMF signal lines 806.

The brushless DC motor controller circuitry 850 is preferably constructed with a conventional motor control circuit such as the Microlinear ML4425/ML4426 IC chip discussed above. The brushless DC motor controller circuitry 850 has control signal outputs that are fed to multiplexer 830.

Multiplexer 830 is a commutation or built-in test select logic MUX that selects between the control signals from the brushless DC motor control circuitry 850 and the built-in-test-control signals from LPU controller 200. Multiplexer 830 supplies the selected control signals to the gate drive and inverter interface 820. The MUX 830 is controlled via control inputs supplied by a controller such as the LPU controller 200 shown in FIG. 2.

The gate drive and inverter interface 820 is a conventional circuit that interfaces with the three phase inverter 810 and drives the gates within the three phase inverter 810 to control conversion of AC and DC power. The three phase inverter 810 receives power from a high voltage DC source which may include, for example, the external DC voltage source such as a battery or the DC bus 61 shown in FIG. 2.

The high voltage DC input power is first dampened by a resistor 802 before being supplied to the three phase inverter 810. A current shunt 804 is also connected to the three phase inverter 810 and measures the current drawn in the motor and flowing in three phase inverter 810 and supplies a voltage proportional to the measured current to the brushless DC motor controller circuitry 850.

The brushless DC motor controller circuitry 850 also receives a speed command. This speed command may be supplied by, for example, the LPU controller 200 shown in FIG. 2. Furthermore, the brushless DC motor controller circuitry 850 outputs motor speed and controller fault status data which may be supplied to the LPU controller 200.

Cooling fluid is also preferably supplied to the three phase inverter 810 to keep this component cool and prevent failure. This may be done by mounting the three phase inverter 810 to a cold plate which is essentially a plenum through which cooling fluid flows. The plenum acts as a heat sink which is continuously drained by the cooling fluid thereby cooling the three phase inverter 810 and preventing failure thereof.

The automatic commutation frequency adjustment circuit 840 has a feedback connection with the brushless DC motor controller circuitry 850, labeled as P3GATEBUF as shown in FIG. 3. This feedback signal P3GATEBUF is a gate drive signal which is at the same commutation frequency of the motor.

Figure 5:
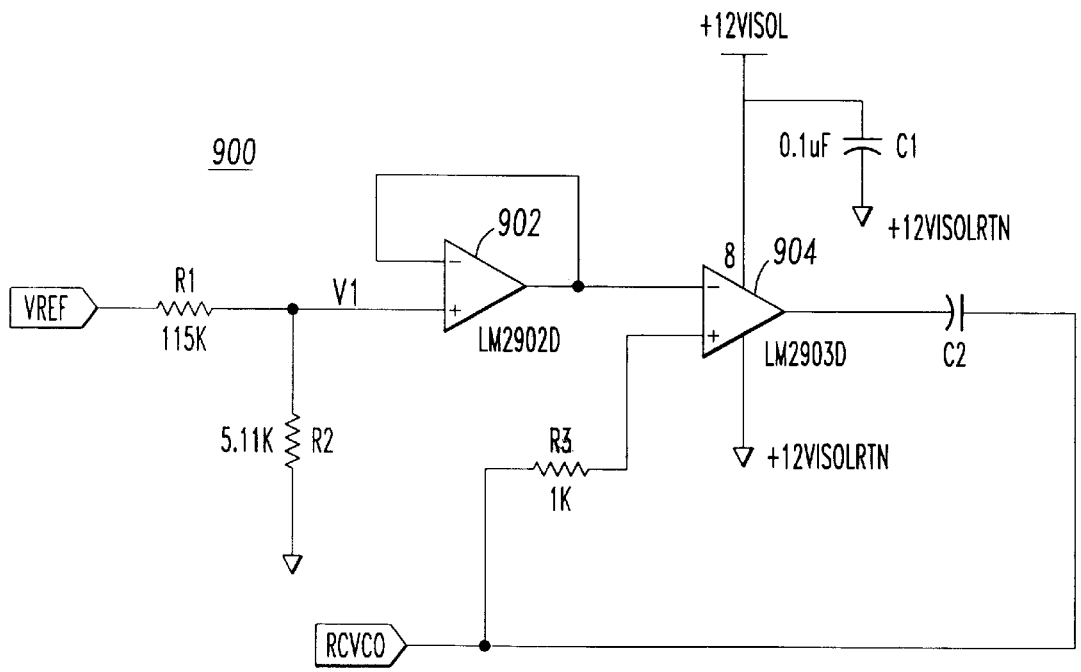
FIG. 5 is a dual slope ramp generation circuit according to the invention that generates a dual slope control signal during the open loop phase of motor starting.
Figure 6:
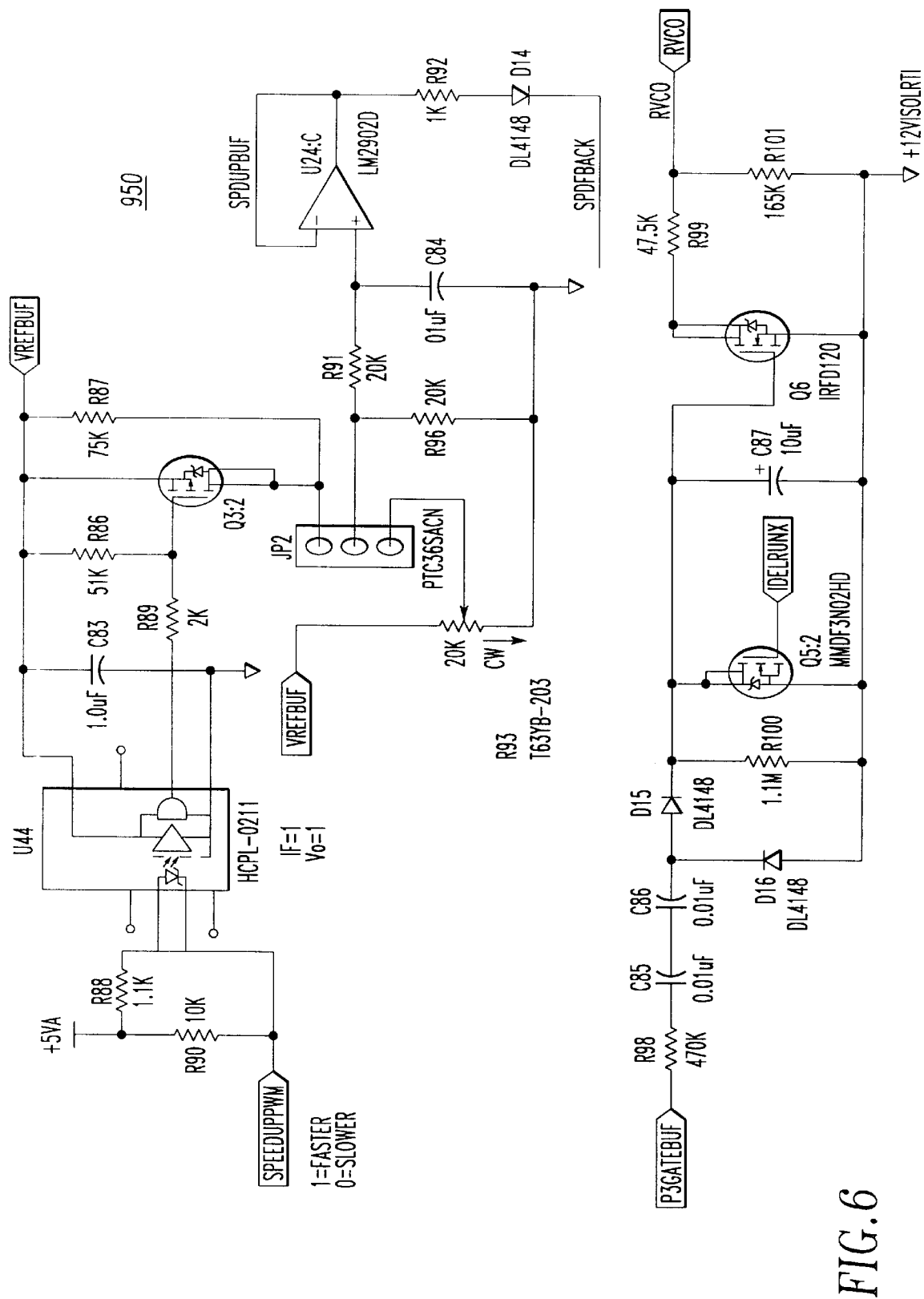
FIG. 6 is a detailed circuit diagram of a speedup circuit according to the invention.

The automatic commutation frequency adjustment circuit 840 includes the dual slope ramp generation circuit 900 that is shown in FIG. 5 and the speed-up circuit 950 shown in FIG. 6.

As shown in FIG. 3 and detailed in FIG. 5, the dual slope ramp generation circuit 900 outputs an RCVCO signal which is a voltage that determines the commutation frequency (motor speed). The rate at which this voltage RCVCO increases determines the acceleration rate of the motor. As shown in FIG. 3 and detailed in FIG. 6, the speed-up circuit 950 includes an RVCO connection to the brushless DC motor controller circuitry 850. The resistance at the RVCO connection point determines the maximum VCO frequency which, in turn, determines the maximum motor speed. This RVCO connection is an existing connection on the conventional Microlinear ML4425/ML4426 IC chip utilized in the preferred embodiment. One of the purposes of the invention is to change the resistance value seen by this RVCO connection point.

The automatic commutation frequency adjustment circuit 840 also receives a SpeedupPWM signal which is a pulse-width modulated signal sent by the LPU controller 200 that acts as a control signal to adjust the speed up voltage.

The dual slope ramp generation circuit 900 shown in FIG. 5 has the following detailed construction. A reference voltage VREF (which may be supplied by the brushless DC motor controller circuitry 840) is voltage divided by resistors R1, R2 to generate voltage V1 that is applied to operational amplifier 902 the negative input of which is connected to the output in a feedback configuration. A comparator 904 receives the output of the first operational amplifier 902 at the differential (negative) input.

Figure 8:
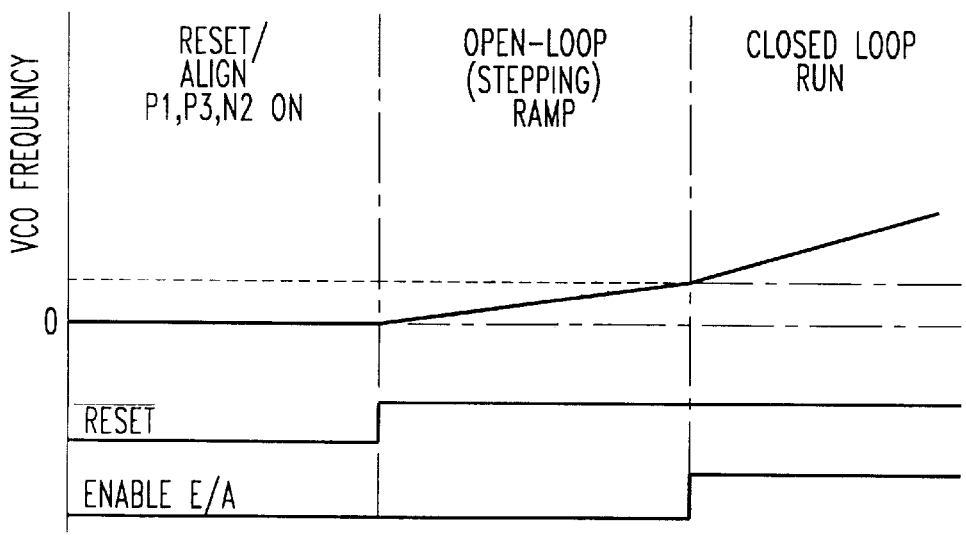
FIG. 8 is a conventional start sequence of the conventional Microlinear ML4425/ML4426 brushless DC motor controller IC chip.
Figures 9, 10:
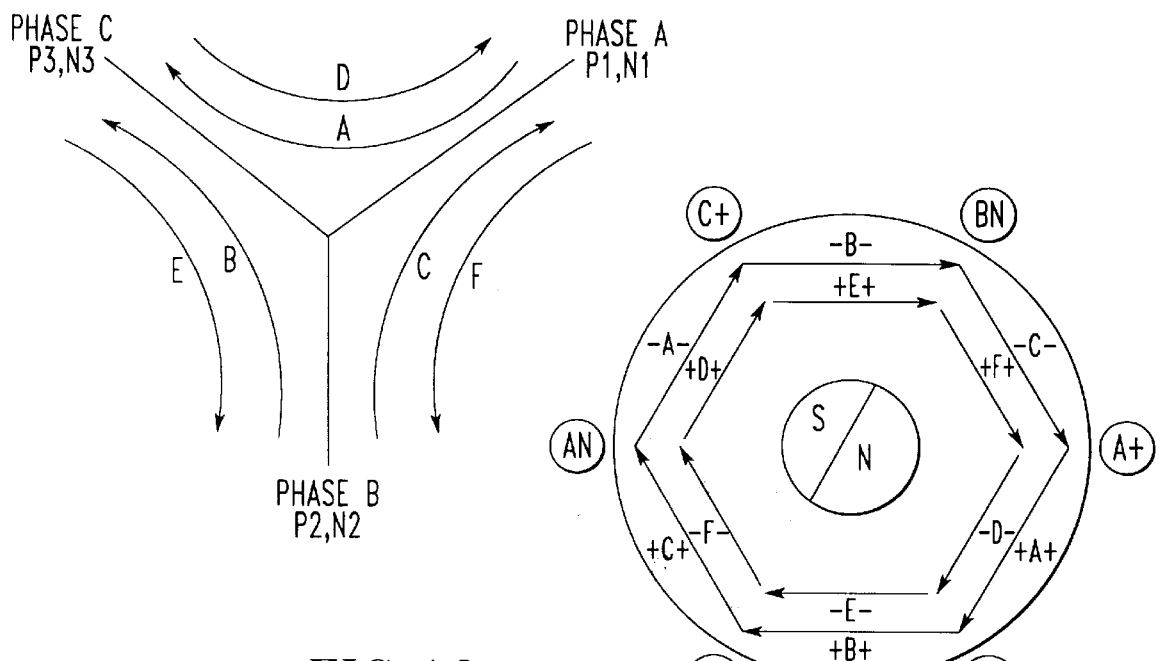
FIG. 9 is a table showing the commutation states of a conventional brushless DC motor controlling start scheme.
FIG. 10 is a conventional commutation sequence in a wye connected motor.

The RCVCO signal from the brushless DC motor controller circuitry 850 is supplied to the positive input of the comparator 904 via resistor R3. The original ramp capacitor that is utilized with the conventional brushless DC motor controller circuitry of FIG. 8 is also connected (not shown) to the RCVO input. A second capacitor C2 is connected between the output of the comparator 904 and the RCVCO voltage.

The dual slope ramp generation circuit 900 operates as follows. The dual slope ramp generation circuit 900 includes circuitry that adds to the conventional brushless DC motor controller circuitry 850 to thereby provide a dual slope during the open loop phase of motor starting. This additional slope is added to the open loop sequence to allow for initial low acceleration operation followed by a faster acceleration rate fast enough to develop sufficient speed and back EMF for the phase lock loop. More particularly, resistors R1 and R2 set a voltage V1. From time t1 through time t2 (see FIG. 4), capacitor C2 is in parallel with the original ramp capacitor. Once V1 is reached, the comparator 904 releases C2 and the ramp rate increases since the two capacitors (the original ramp capacitor) and C2 are no longer in parallel.

Figure 4:
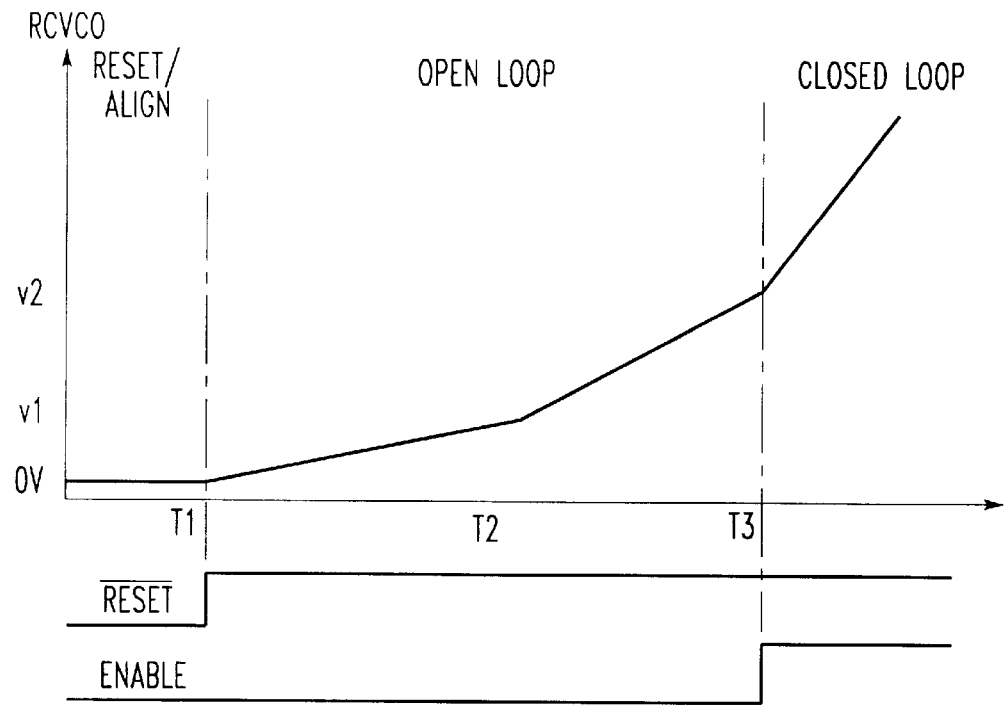
FIG. 4 is the inventive start sequence which is a modification of the conventional motor start sequence shown in FIG. 8.

Time t3 shown in FIG. 4 is selected based on the length of the time the rotor can follow the second slope. Actual values for resistors R1, R2 and C2 are shown in FIG. 5. The capacitance of C2 is selected based on the initial low acceleration rate of the particular permanent magnet generator being driven as a motor such that sufficient acceleration is provided for the rotor that will follow the ramp generated by the circuit 900.

The dual slope ramp generation circuit 900 shown in FIG. 5 is a preferred implementation. However, this implementation is not intended to be the only implementation contemplated herein. Indeed, any circuit that has the capability of generating the open loop start sequence shown in FIG. 4 is within the scope of this invention.

An important feature is that at least two distinct ramps or slopes are utilized during the open loop sequence, wherein the first ramp allows for initial low acceleration rate followed by a second ramp having a steeper slope that drives the rotor at an acceleration rate fast enough to develop sufficient speed and back EMF for the phase lock loop in the closed loop sequence. The actual slopes utilized will, of course, depend on the particular brushless DC permanent magnet motor/generator 15 being driven by the start inverter unit 80 of the invention.

A further alternative for the modified start sequence shown in FIG. 4 is an exponential curve that spans between times t1 and t3. Such an exponential curve may also perform the functions of allowing for initial low acceleration rate with sufficient acceleration rate fast enough to develop sufficient speed and back EMF for the phase lock loop. An exponential curve may be generated, for example, by a simple RC (resistor-capacitor) circuit having a construction well-known to those of ordinary skill in the art.

When the motor has reached the closed loop sequence via the dual slope open loop start sequence which will achieve a sufficient back EMF, then the phase lock loop in the closed loop sequence can then take over and continue driving the motor. The closed loop sequence operates by utilizing the back EMF sensed at the output of the three phase inverter 810 and supplied via signal lines 806 to the brushless DC motor controller circuitry 850. This back EMF is utilized to establish a phase lock loop which generates control signals for the three phase inverter 810 that commutate the motor and continue ramping up the RCVCO voltage and thereby the shaft speed.

When the motor has overcome the initial high friction bearing drag such as when the shaft has lifted off the air bearings, the next step is to accelerate the motor to achieve an operating rotational speed sufficient for starting the motor and thereafter using the motor to drive the generator to produce electricity.

In the implementation of this invention, the bearing lift-off occurs at 5 KRPM. The conventional closed loop back EMF phase lock loop generated by the conventional motor controller circuitry does not allow for a VCO range high enough in frequency to achieve typical shaft RPMs for the engine. A typical shaft RPM is on the order of 35 KRPM which simply cannot be achieved with the conventional motor controller circuitry configured to perform low speed starting to overcome friction.

To overcome these limitations, the speed-up circuit shown in FIG. 6 was realized to decrease the resistor input (RVCO) for the conventional DC motor controller circuitry 850 in order to increase the maximum VCO output frequency which allows faster speed operation.

The speed-up circuit 950 shown in FIG. 6 utilizes FETQ6 to slowly bring resistor R99 in parallel with resistor R101 thereby reducing the effective resistance in the VCO timing circuit.

The FETQ6 voltage can be driven by two sources as determined by the jumper JP2 and the connection/disconnection state of the P3GATEBUF signal line. The first option is realized when a connection between JP2-2 and JP2-3 is made and the P3GATEBUF signal line is connected to the automatic commutation frequency adjustment circuit. The second option is realized when a connection between JP 2-1 and JP2-2 is made and the P3GATEBUF signal line is disconnected from the automatic commutation frequency adjustment circuit 840.

In the first option, a feedback signal from the P3 gate drive (P3GATEBUF in FIGS. 3 and 6) that is proportional to speed is utilized to drive FETQ6. Once the motor reaches a threshold speed such as the speed at which the bearing drag substantially decreases (e.g., a bearing lift-off for an air bearing which may occur at about 5 KRPM), the voltage on the gate of the FETQ6 increases. Resistor R93 provides an initial voltage on the gate of the FETQ6 to reduce the speed-up time once the motor reaches the threshold voltage (e.g., 5 KRPM). The FETQ6 starts to turn on causing the VCO output to increase and the motor speed thereby increases. Once the FETQ6 is fully on, the motor speed can be adjusted over a range of relatively high speeds via the speed command. In this example, these relatively high speeds range from 10K to 35 KPRM.

The second source for the FETQ6 voltage is through the optical coupler U44 which receives the Speedup PWM signal from the LPU controller 200. The voltage out of this optical coupler U44 is proportional to the duty cycle of the Speedup PWM signal. The LPU controller 200 will control this voltage as a function of motor speed to slowly bring resistor R99 in parallel with resistor R101. The FETQ6 threshold voltage varies with temperature and has prevented the FETQ6 from being turned on completely which in turn prevents speed-up in the first option. The Speedup PWM signal generated by a controller such as the LPU controller 200 in the second option will be able to drive the appropriate voltage based on the measured speed to ensure speed-up despite such temperature effects.

As an alternative, the jumper JP2 may be replaced by a multiplexer that is controlled by LPU controller 200. In this alternative, a second multiplexer may be utilized to connect/disconnect the P3GATEBUF to/from the automatic commutation frequency adjustment circuit 840. This second multiplexer is controlled by the LPU controller 200. These multiplexers essentially select between using the P3GATEBUF feedback signal that is proportional to motor speed to automatically increase the output commutation frequency and using the Speedup PWM signal from the LPU controller 200 to increase the output commutation frequency. By utilizing this alternative, manual changes to the jumper JP2 for selecting the control signal and manual connection/disconnection of the P3GATEBUF signal line can be automated and put under the control of LPU controller 200.

Figure 7:
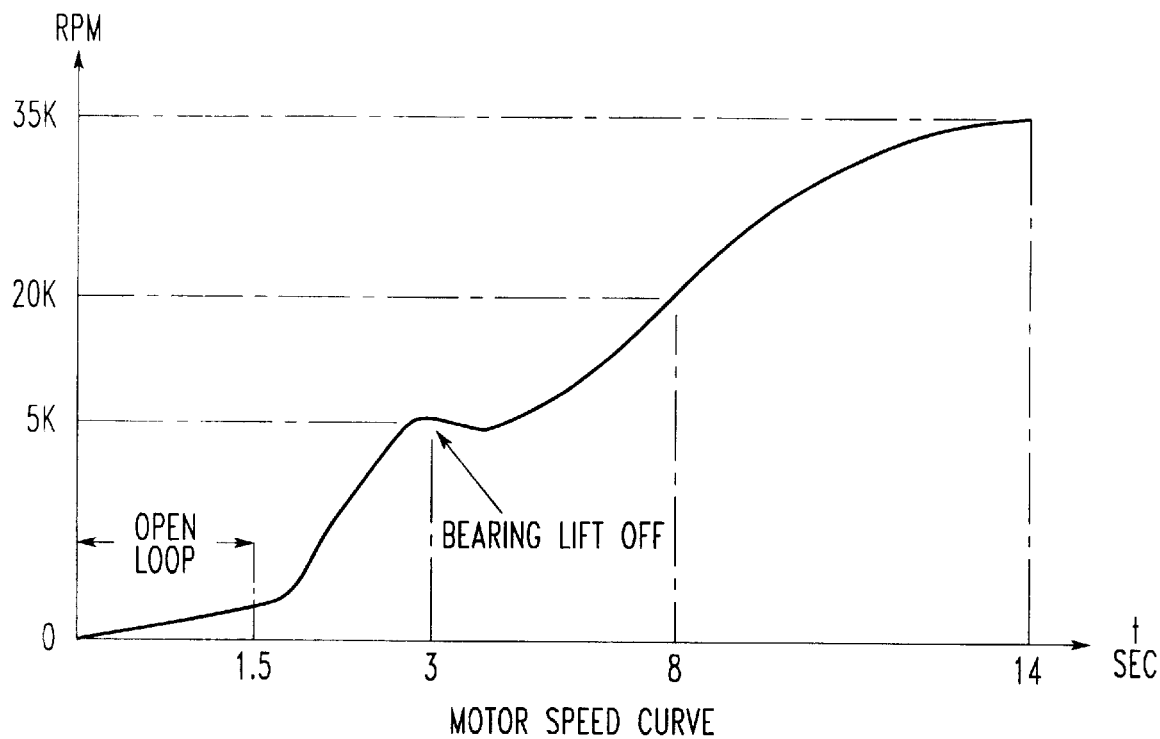
FIG. 7 is a motor speed curve showing actual results from an implemented embodiment of the invention in which a motor was rotated by a generator driven by the inventive starting circuits.

FIG. 7 illustrates an exemplary motor speed curve showing the results of the speed-up circuit 950. As shown in FIG. 7, the motor speed curve starts at 0 and continues through the open loop sequence. After the loop sequence completes, the closed loop sequence begins, and the speed-up circuit 950 is then operational. The resulting control from the speed-up circuit 950 produces the motor speed curve starting from the end of the open loop sequence until the terminal motor speed is achieved. In this example, the terminal motor speed is 35 KRPM.

During a testing phase, the LPU controller 200 sends a signal to the multiplexer 830 thereby causing the multiplexer 830 to select built-in test inputs from the LPU controller to be fed to the gate drive and inverter interface 820. In this way, various test control inputs can be fed directly to the three phase inverter 810 to test the operation of the start inverter unit 80 and/or the brushless DC motor/generator 15.

The invention being thus described, it will be obvious that the same may be varied in many ways. Such variations are not to be regarded as departure from the spirit and scope of the invention, and all such modifications as would as would be obvious to one skilled in the art are intended to be included within the scope of the following claims.

What is claimed is:

1. A line power unit which delivers electrical power to a grid from a three phase permanent magnet generator, comprising:

a full wave rectifier connected to the three phase permanent magnet generator, said full wave rectifier converting a three phase AC voltage from the three phase permanent magnet generator to a DC voltage;

a DC bus connected to the output of said full wave rectifier;

a main inverter connected to said DC bus, said inverter functioning as a current source and transforming the DC voltage to a controlled three phase alternating voltage;

an inductor unit connected to the output of said inverter;

a contactor unit selectively connecting and disconnecting said inductor unit to and from the grid;

a transformer connected between said inductor unit and said contactor unit;

an engine for driving said three phase permanent magnet generator;

an engine start inverter unit connected to said DC bus and the three phase permanent magnet generator, wherein upon a start phase said contactor unit closes to connect the grid to said transformer to develop three phase AC power and thereby spin the permanent magnet generator as a motor to allow the engine to be started, said engine start inverter unit including:
   a three phase start inverter connected to said DC bus and the three phase permanent magnet generator,
   a gate drive/inverter interface controlling the three phase AC voltage supplied to the three phase permanent magnet generator by said start inverter,
   a brushless motor control circuit connected to said gate drive/inverter interface, and an input receiving a signal measuring an amount of current being drawn by the motor, and a back EMF input receiving a back EMF from the three phase permanent magnet generator being driven as a motor,
   said brushless motor control circuit controlling said gate drive and inverter interface according to a speed command thereby causing said three phase start inverter to deliver a three phase voltage to the permanent magnet generator at a controlled commutation frequency, and
   an automatic commutation frequency adjustment circuit connected to said brushless motor control circuit for automatically adjusting the commutation frequency as a function of permanent magnet generator speed.

2. The line power unit according to claim 1, said automatic commutation frequency adjustment circuit having multiple commutation frequency ranges.

3. The line power unit according to claim 2, said automatic commutation frequency adjustment circuit gradually changing between the multiple commutation frequency ranges.

4. The line power unit according to claim 2, wherein the multiple commutation frequency ranges include a first ramp and a second ramp, said automatic commutation frequency adjustment circuit changing between the first and second ramps during an open loop commutation sequence.

5. The line power unit according to claim 4, wherein the second ramp has a slope steeper than the first ramp.

6. The line power unit according to claim 1, further comprising:

a line power unit controller connected to said start inverter and to said brushless motor control circuit, said brushless motor control circuit supplying speed data indicating a speed of said permanent magnet generator being driven as a motor and fault status data to said line power unit controller, said three phase inverter supplying inverter fault data indicating a fault in said three phase inverter to said line power unit controller, said line power unit controller controlling said start inverter unit according to the speed data, the fault status data, the inverter fault data, and the speed command.

7. The line power unit according to claim 1, further comprising:

a line power unit controller connected to said start inverter and to said brushless motor control circuit, said start inverter unit further including:
   a MUX switching between inputs from said brushless motor control circuit and a built-in-test-and-control input from said line power unit controller to provide a selected output to said gate drive/inverter interface,
   said MUX being controlled by said line power unit controller.

8. An apparatus for controlling a permanent magnet generator as a motor to spin an engine connected to the permanent magnet generator to allow the engine to be started, comprising:

a DC voltage source, a start inverter unit connected to said DC voltage source and a three phase permanent magnet generator, said start inverter unit including:
   a three phase start inverter connected to a DC bus and the three phase permanent magnet generator,
   a gate drive/inverter interface controlling the three phase AC voltage supplied to the three phase permanent magnet generator by said start inverter,
   a brushless motor control circuit connected to said gate drive/inverter interface, and a DC current input receiving a signal measuring current drawn by the motor, and a back EMF input receiving a back EMF from the three phase permanent magnet generator being driven as a motor,
   said brushless motor control circuit controlling said gate drive and inverter interface according to a speed command thereby causing said three phase start inverter to deliver a three phase voltage to the permanent magnet generator at a controlled commutation frequency, and
   an automatic commutation frequency adjustment circuit connected to said brushless motor control circuit for automatically adjusting the commutation frequency as a function of permanent magnet generator speed.

9. The apparatus according to claim 8,
said automatic commutation frequency adjustment circuit having multiple commutation frequency ranges.

10. The apparatus according to claim 9,
said automatic commutation frequency adjustment circuit gradually changing between the multiple commutation frequency ranges.

11. The apparatus according to claim 9,
wherein the multiple commutation frequency ranges include a first ramp and a second ramp,
said automatic commutation frequency adjustment circuit changing between the first and second ramps during an open loop commutation sequence.

12. The apparatus according to claim 11,
wherein the second ramp has a slope steeper than the first ramp.

13. The apparatus according to claim 8, further comprising:
a line power unit controller connected to said start inverter and to said brushless motor control circuit,
said brushless motor control circuit supplying speed data indicating a speed of said permanent magnet generator being driven as a motor and fault status data to said line power unit controller,
said three phase inverter supplying inverter fault data indicating a fault in said three phase inverter to said line power unit controller,
said line power unit controller controlling said start inverter unit according to the speed data, the fault status data, the inverter fault data, and the speed command.

14. The apparatus according to claim 8, said DC voltage source including:
an AC voltage source,
an inverter connected to the AC voltage source and producing DC voltage.

15. The apparatus according to claim 14, further comprising:
a transformer connected between said AC voltage source and said inverter, said transformer stepping down the AC voltage from said AC voltage source,
wherein said AC voltage source is a utility grid.

16. A line power unit which delivers electrical power to a grid from a three phase permanent magnet generator, comprising:
a full wave rectifier connected to the three phase permanent magnet generator, said full wave rectifier converting a three phase AC voltage from the three phase permanent magnet generator to a DC voltage;
a DC bus connected to the output of said full wave rectifier;
a main inverter connected to said DC bus, said inverter functioning as a current source and transforming the DC voltage to a controlled three phase alternating voltage;
an inductor unit connected to the output of said inverter;
a contactor unit selectively connecting and disconnecting said inductor unit to and from the grid;
a transformer connected between said inductor unit and said contactor unit;
an engine for driving said three phase permanent magnet generator;
an engine start inverter unit connected to said DC bus and the three phase permanent magnet generator,
wherein upon a start phase said contactor unit closes to connect the grid to said transformer to develop three phase AC power and thereby spin the permanent magnet generator as a motor to allow the engine to be started,
said engine start inverter unit including:
a three phase start inverter connected to said DC bus and the three phase permanent magnet generator,
a gate drive/inverter interface controlling the three phase AC voltage supplied to the three phase permanent magnet generator by said start inverter,
a brushless motor control circuit connected to said gate drive/inverter interface, and an input receiving a signal measuring an amount of current being drawn by the motor, and a back EMF input receiving a back EMF from the three phase permanent magnet generator being driven as a motor,
said brushless motor control circuit controlling said gate drive and inverter interface according to a speed command thereby causing said three phase start inverter to deliver a three phase voltage to the permanent magnet generator at a controlled commutation frequency,
an automatic commutation frequency adjustment circuit connected to said brushless motor control circuit for automatically adjusting the commutation frequency as a function of permanent magnet generator speed;
said brushless motor control circuit transitioning from an open loop commutation sequence to a closed loop commutation sequence upon receiving an enable signal, wherein the closed loop commutation sequence utilizes the back EMF to control the commutation frequency, and
a speed-up circuit connected to said brushless motor control circuit, said speed-up circuit increasing the output commutation frequency of said brushless motor control circuit.

17. The line power unit according to claim 16,
said speed-up circuit utilizing a feedback gate drive signal from said brushless motor control circuit indicative of motor speed to automatically increase the output commutation frequency.

18. The line power unit according to claim 16,
said speed-up circuit increasing the output commutation frequency in response to a speedup pulse width modulated signal.

19. An apparatus for controlling a permanent magnet generator as a motor to spin an engine connected to the permanent magnet generator to allow the engine to be started, comprising:
a DC voltage source,
an engine start inverter unit connected to said DC voltage source and the three phase permanent magnet generator,
said engine start inverter unit including:
a three phase start inverter connected to a DC bus and the three phase permanent magnet generator,
a gate drive/inverter interface controlling the three phase AC voltage supplied to the three phase permanent magnet generator by said engine start inverter,
a brushless motor control circuit connected to said gate drive/inverter interface, and a DC current input receiving a signal measuring current drawn by the motor, and a back EMF input receiving a back EMF from the three phase permanent magnet generator being driven as a motor, said brushless motor control circuit controlling said gate drive and inverter interface according to a speed command thereby causing said three phase start inverter to deliver a three phase voltage to the permanent magnet generator at a controlled commutation frequency;

said brushless motor control circuit transitioning from an open loop commutation sequence to a closed loop commutation sequence upon receiving an enable signal, wherein the closed loop commutation sequence utilizes the back EMF to control the commutation frequency, and a speed-up circuit connected to said brushless motor control circuit, said speed-up circuit increasing the output commutation frequency of said brushless motor control circuit.

20. The apparatus according to claim 19, said speed-up circuit utilizing a feedback gate drive signal from said brushless motor control circuit indicative of motor speed to automatically increase the output commutation frequency.

21. The apparatus according to claim 19, said speed-up circuit increasing the output commutation frequency in response to a speedup pulse width modulated signal.

22. An apparatus for controlling a permanent magnet generator as a motor to spin an engine connected to the permanent magnet generator to allow the engine to be started, comprising:

a DC voltage source, an engine start inverter unit connected to said DC voltage source and a three phase permanent magnet generator, said engine start inverter unit including:

a three phase start inverter connected to a DC bus and the three phase permanent magnet generator, a gate drive/inverter interface controlling the three phase AC voltage supplied to the three phase permanent magnet generator by said start inverter, a brushless motor control circuit connected to said gate drive/inverter interface, and a DC current input receiving a signal measuring current drawn by the motor, and a back EMF input receiving a back EMF from the three phase permanent magnet generator being driven as a motor, said brushless motor control circuit controlling said gate drive and inverter interface according to a speed command thereby causing said three phase start inverter to deliver a three phase voltage to the permanent magnet generator at a controlled commutation frequency;

a line power unit controller connected to said start inverter and to said brushless motor control circuit, a MUX switching between inputs from said brushless motor control circuit and built-in-test-and-control input from said line power unit controller to provide a selected output to said gate drive/inverter interface, and wherein said MUX is controlled by said line power unit controller.

* * * * *